(12) United States Patent
Hosch et al.

(10) Patent No.: US 6,685,009 B1
(45) Date of Patent: Feb. 3, 2004

(54) CONTINUOUS BELT CONVEYOR TENSIONING MECHANISM

(75) Inventors: Michael A. Hosch, Oconomowoc, WI (US); Scott M. Hall, Sussex, WI (US); Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 10/438,961

(22) Filed: May 15, 2003

(51) Int. Cl.[7] ............................................. B65G 23/44
(52) U.S. Cl. .................................................... 198/813
(58) Field of Search ................................. 198/813, 812, 198/816, 817

(56) References Cited

U.S. PATENT DOCUMENTS

| | | | | |
|---|---|---|---|---|
| 293,383 | A | * 2/1884 | Wagner | 198/813 |
| 380,400 | A | * 4/1888 | Menke | 198/813 |
| 1,000,974 | A | * 8/1911 | Anderson | 198/813 |
| 1,347,121 | A | 7/1920 | Rice | |
| 5,156,260 | A | * 10/1992 | Dorner et al. | 198/813 |
| 5,156,261 | A | * 10/1992 | Dorner | 198/816 |
| 5,174,435 | A | * 12/1992 | Dorner et al. | 198/806 |
| 5,632,372 | A | * 5/1997 | Steinbuchel et al. | 198/813 |
| 5,984,083 | A | * 11/1999 | Hosch et al. | 198/810.04 |
| 6,109,427 | A | 8/2000 | Hosch et al. | |
| 6,209,715 | B1 | * 4/2001 | Eltvedt | 198/813 |
| 6,298,981 | B1 | * 10/2001 | Hosch et al. | 198/813 |

* cited by examiner

Primary Examiner—Richard Ridley
(74) Attorney, Agent, or Firm—Andrus, Sceales, Starke & Sawall, LLP

(57) ABSTRACT

A conveyor construction includes a frame having a pair of side members, a belt and a tensioning section mounted for longitudinal extendable and retractable movement relative to the frame for establishing a desired tension on the belt. The tensioning section includes a spindle engaged with the belt and a pair of side plate structures connected to the spindle and located one adjacent each frame side member. A drive member is rotatably mounted relative to the frame and is drivingly engaged with the tensioning section for imparting longitudinal extendable and retractable movement relative to the frame upon rotation of the drive member. A locking device inserts a frictional locking force on the side plate structures relative to the frame side members for selectively fixing the position of the tensioning section relative to the frame. A restraining arrangement is incorporated in the side plate structures for limiting the retractable movement of the tensioning section upon the imposition of a random force applied to the spindle and overcoming the frictional locking force of the locking device so as to substantially retain the desired tension on the belt and preserve operability of the drive member.

27 Claims, 5 Drawing Sheets

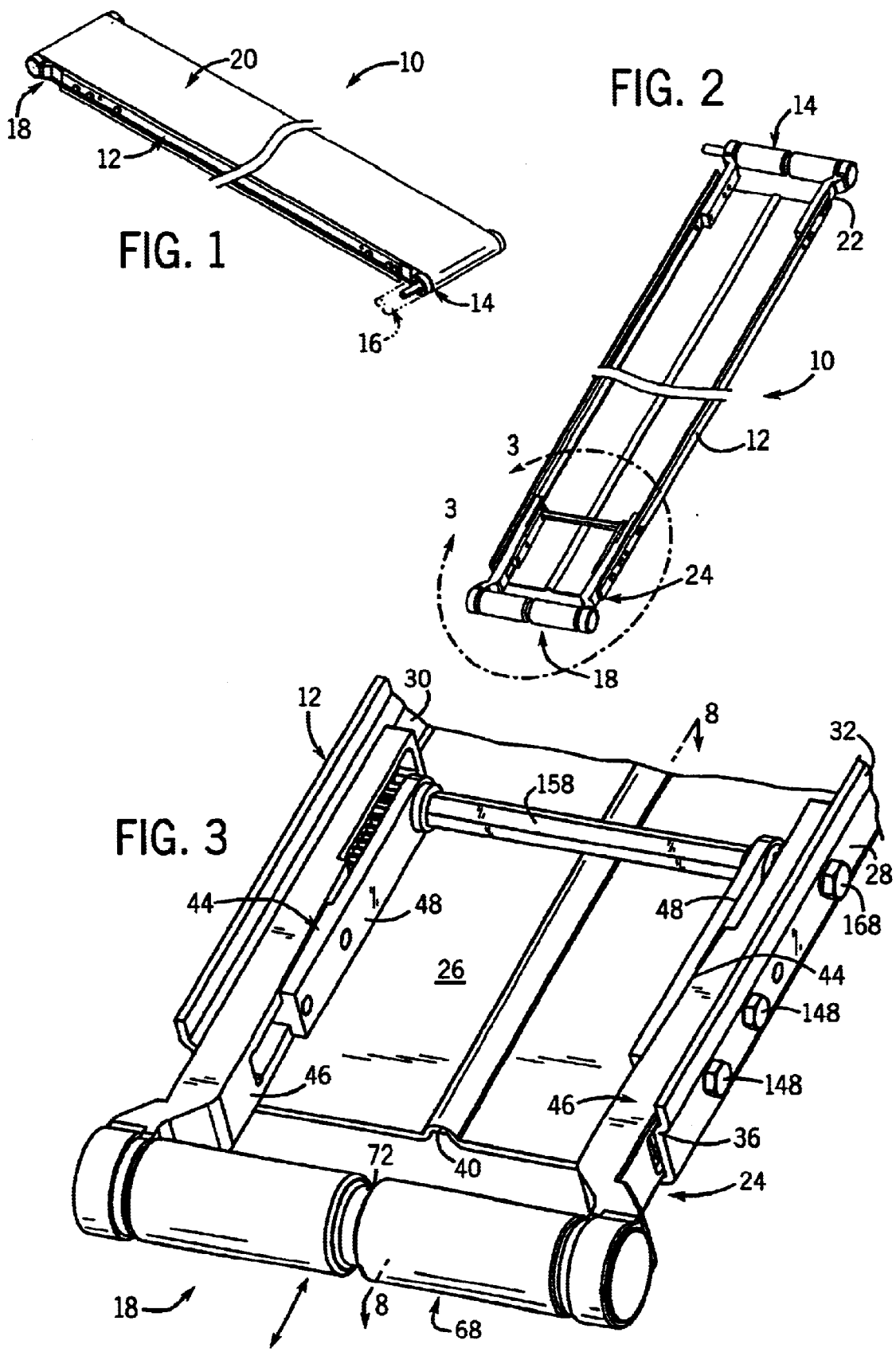

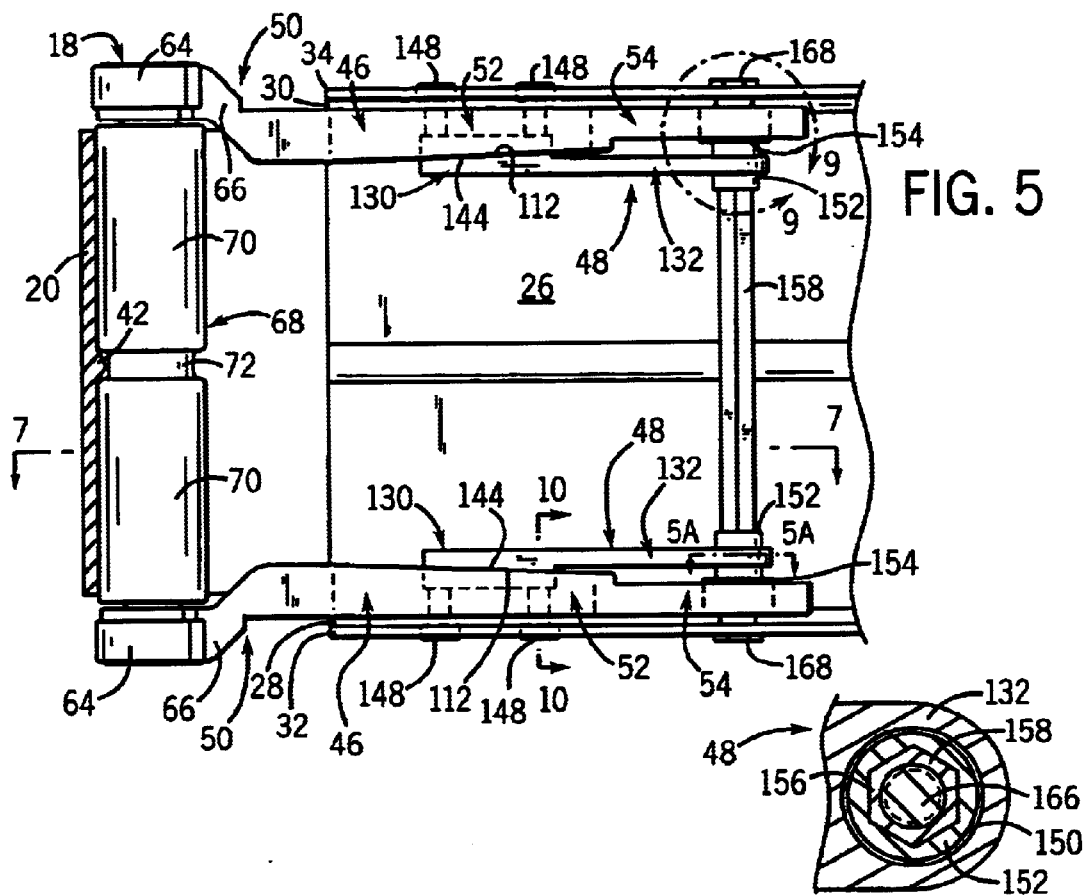
FIG. 5
FIG. 5A
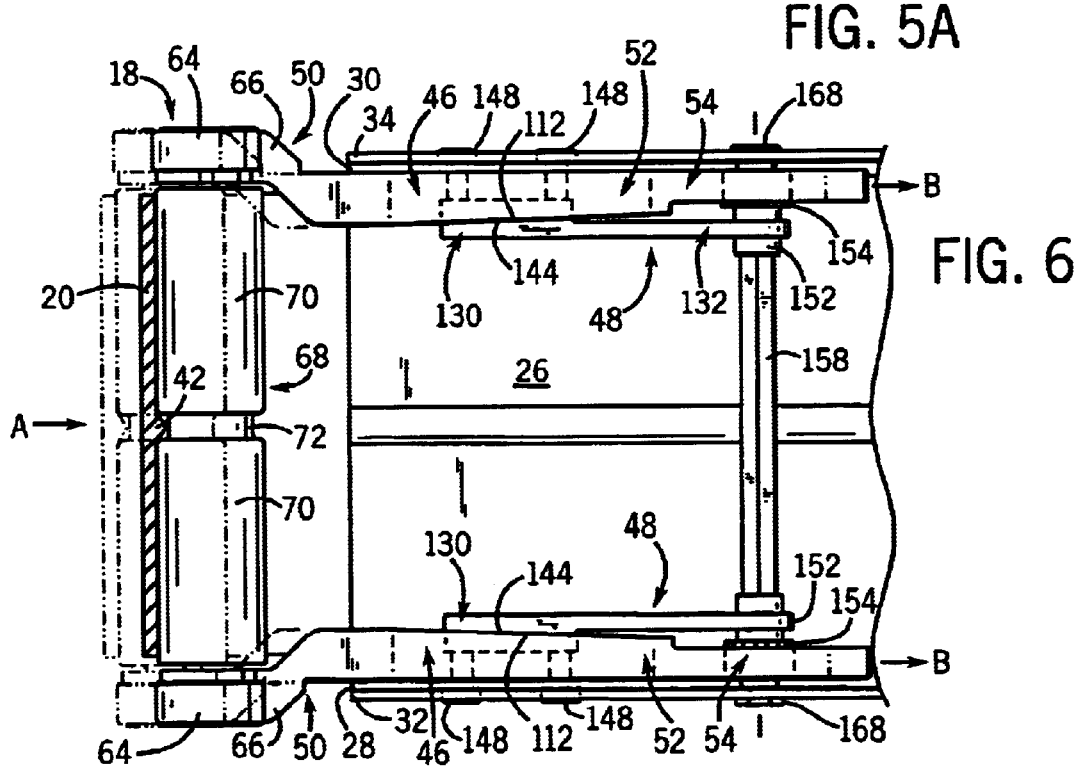
FIG. 6

CONTINUOUS BELT CONVEYOR TENSIONING MECHANISM

FIELD OF THE INVENTION

This invention relates broadly to conveyor construction and, more particularly, pertains to developments in the mechanism for tensioning the continuous belt of the conveyor.

BACKGROUND OF THE INVENTION

The present invention contemplates improvements to a known conveyor construction such as generally disclosed in Hosch et al. U.S. Pat. No. 6,298,981, the disclosure which is hereby incorporated by reference. The '981 patent discloses a conveyor construction including a frame and a tensioning section including spaced side members mounted for longitudinal movement relative to the frame. The tensioning section includes a spindle about which a conveyor belt is trained, and movement of the tensioning section functions to control the tension of the belt. A drive and locking arrangement for imparting movement to the tensioning section and for selectively locking the tensioning section in position includes a pair of pinion carriers or retainer blocks mounted one to each side of the frame, with a drive pinion being rotatably supported by the retainer blocks. Each side member includes integrally formed gear teeth engageable with opposite ends of the drive pinion, and a drive pinion actuator is engaged with one side of the frame for imparting rotation to the drive pinion to extend and retract the tensioning section. A locking arrangement is interconnected with the opposite end of the drive pinion, and functions to selectively frictionally engage the drive pinion with one of the retainer blocks to prevent rotation of the drive pinion and to thereby maintain the tensioning section in a desired position relative to the frame.

This construction is generally satisfactory, but can present problems upon the imposition of a sudden or random force applied to the spindle once the tensioning section has been locked into a particular position so as to set a desired tension for the moving belt. Such a force may be caused by a collision or impact of the spindle with another piece of equipment or with a structural member, such as a wall. If this impact force has enough intensity, it can overcome the frictional locking force of the locking arrangement, such as by shearing or stripping the locking components, resulting in undesirable, retractable movement of the tensioning section which will alter the belt tension and negatively affect the performance of the conveyor. In some designs, the impact force may act to drive the gear teeth on the moving side members against the drive pinion as its locked position is overcome causing damage or destruction to the gear teeth on the drive pinion.

It is desirable to provide a conveyor construction which rectifies the problems described above, and offers enhancements in the components, assembly, operation and maintenance of the tensioning section of the conveyor.

SUMMARY OF THE INVENTION

It is one object of the present invention to provide a conveyor construction in which involuntary, retractable movement of the tensioning section is limited so as to maintain a desired tension on the conveyor belt and preserve the integrity of the drive pinion structure.

It is also an object of the present invention to provide a conveyor construction which relies upon wedging action between the components of the tensioning unit to prevent damage to the drive pinion structure when an undesirable force is inflicted upon the spindle.

It is a further object of the present invention to provide a conveyor construction having an improved structure for engaging the drive pinion structure with the tensioning section.

In accordance with one aspect of the invention, a conveyor construction includes a frame having a pair of side members, a belt and a tensioning section mounted for longitudinal extendable and retractable movement relative to the frame for establishing a desired tension on the belt. The tensioning section includes a spindle engaged with the belt and a pair of side plate structures connected to the spindle and located one adjacent each frame side member. A drive member is rotatably mounted relative to the frame and is drivingly engaged with the tensioning section for imparting longitudinal extendable and retractable movement relative to the frame upon rotation of the drive member. A locking device exerts a frictional locking force on the side plate structures relative to the frame side members for selectively fixing the position of the tensioning section relative to the frame. This aspect of the invention contemplates an improvement in the form of a restraining arrangement incorporated in the side plate structures for limiting the retractable movement of the tensioning section upon the imposition of a random force applied to the spindle and overcoming the frictional locking force of the locking device so as to substantially retain the desired tension on the belt and preserve operability of the drive member.

Each of the side plate structures includes a first member which is selectively moveable or lockable relative to a fixed second member. The first member preferably includes a head plate extending longitudinally along an inside surface of one of the frame side members. The second member preferably includes a clamp plate extending longitudinally along an inside surface of the head plate. The head plate is integrally constructed of a forward portion, a mid portion and a rear portion. The spindle has opposed ends, each end being rotatably mounted to the head plate. The forward portion of the head plate includes a circular socket member connected to the mid portion by an angularly and inwardly offset segment. The socket member receives a spherical ball bearing assembly for enabling rotation of the spindle. The mid portion is formed with a first throughslot and includes a first pair of upper and lower angled surfaces. The rear portion is formed with a second throughslot and includes a set of teeth extending axially along a wall forming the second throughslot. The drive member has opposed ends provided with drive pinion ends rotatably mounted to the frame members. Each drive pinion end extends into the second throughslot for engagement with axially extending teeth on the rear portion of the head plate. The clamp plate includes a restraining block integrally connected to an extension portion which rotatably receives an adapter connected to each drive pinion end. The restraining block is inserted into the first throughslot formed in the mid portion of the head plate and locked to one of the frame side members. The restraining block includes a second pair of upper and lower angled surfaces which are selectively slidably and lockingly engageable with the first pair of upper and lower angled surfaces on the mid portion of the head plate. The first and second pairs of angled surfaces are constructed and arranged to move into a wedging relationship with one another upon imposition of the random force applied to the spindle.

In accordance with another aspect of the invention, a conveyor construction includes a frame having a pair of side members, a belt and a tensioning section mounted for longitudinal extendable and retractable movement relative to the frame for establishing a desired tension on the belt. The tensioning section includes a spindle engaged with the belt and a pair of side plate structures connected to the spindle and located one adjacent each frame side member. A drive member is rotatably mounted relative to the frame and is drivingly engaged with the tensioning section for imparting longitudinal extendable and retractable movement relative to the frame upon rotation of the drive member. A locking device exerts a frictional locking force on the side plate structures relative to the frame side members for selectively fixing the position of the tensioning section relative to the frame. The conveyor construction is improved wherein each of the side plate structures includes a first member selectively movable and lockable with respect to a second member. The first member is freely slidable upon the second member when the tensioning section is extended, and the first member is slidable into a wedging relationship with the second member when the tensioning section is retracted.

The first member is preferably a head plate formed with a top wall, a bottom wall and a first throughslot. The head plate includes upper and lower inner edges having planar surfaces which angle slightly outwardly towards a respective one of the frame side members as the head plate extends from front to rear. The second member is preferably a clamp plate including a restraining block having an outer section received in the first throughslot, and an inner section which is coplanar with an extension portion. The outer section of the restraining block includes an upper horizontal surface engageable with an outer, bottom portion of the head plate top wall, and a lower horizontal surface engageable with an outer, top portion of the head plate bottom wall. The inner section of the restraining block includes an upper vertical face engageable with the upper inner edge of the head plate, and a lower vertical face engageable with the lower, inner edge of the head plate. The upper and lower vertical faces have planar surfaces which extend at an angle from front to rear similar to the angle formed on the upper and lower inner edges on the head plate. The locking device includes a pair of fasteners passing through respective holes formed in a respective frame side member and the first throughslot in threaded engagement with the restraining block whereby tightening of the fasteners will lock the head plate and clamp plate together relative to the respective frame side member.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a perspective view of the conveyor assembly according to the present invention;

FIG. 2 is another perspective view of the conveyor assembly of FIG. 1 shown turned over with the conveyor belt removed;

FIG. 3 is an enlarged, detail or bottom perspective view of the movable tension section of the conveyor assembly taken on line 3—3 of FIG. 2;

FIG. 5 is a plan view of the movable tensioning section shown in FIG. 3;

FIG. 5A is an enlarged, fragmentary sectional view taken on line 5A—5A of FIG. 5;

FIG. 6 is a view like FIG. 5 showing the tensioning section moved relative to the conveyor frame in the direction of the arrows;

DETAILED DESCRIPTION OF THE INVENTION

Figure 4:
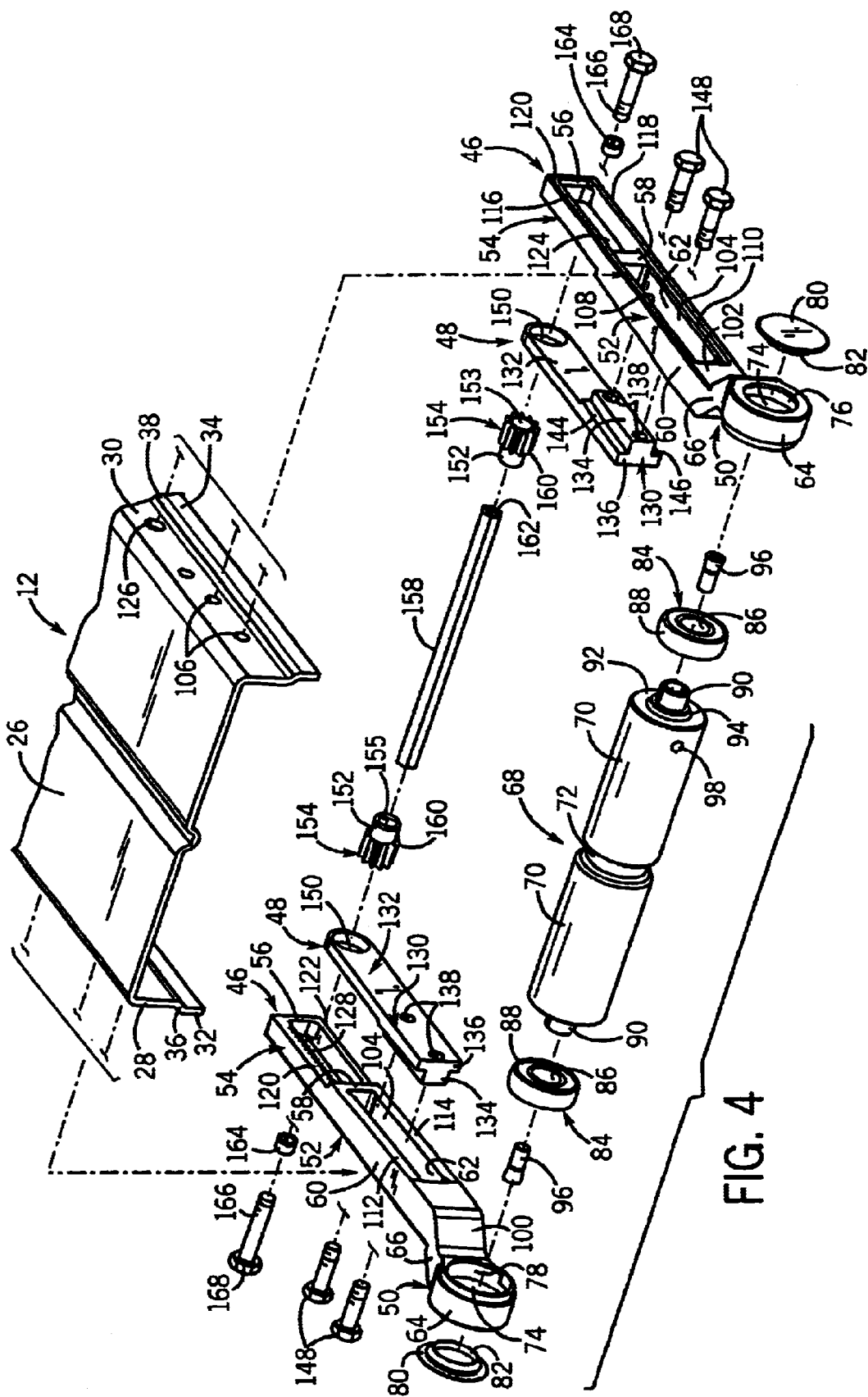
FIG. 4 is a reverse, exploded view of the movable tensioning section.
Figure 7:
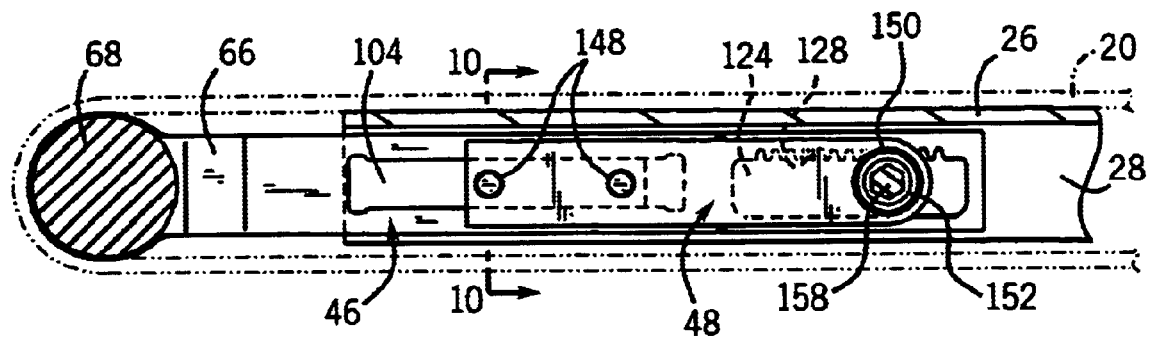
FIG. 7 is an enlarged, fragmentary sectional view taken on line 7—7 of FIG. 5.
Figure 9:
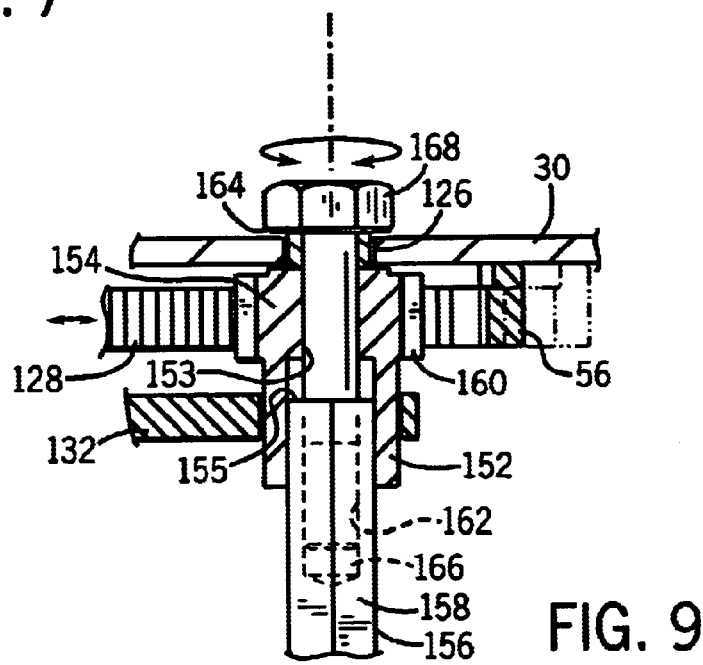
FIG. 9 is an enlarged, detailed view in partial cross section taken on line 9—9 of FIG. 5.

Referring to FIGS. 1 and 2, a conveyor assembly 10 generally includes a frame 12, a stationary drive section 14 interconnected with a motor 16, a movable tensioning section 18, and a belt 20.

Frame 12 extends between a first end 22 located adjacent drive section 14 and a second end 24 located adjacent tensioning section 18. Referring to FIGS. 3 and 4, frame 12 includes an upper wall or support surface 26 and a pair of depending side flanges or walls 28, 30 extending downwardly from the sides of upper wall 26. Side wall 28 includes an outwardly offset lower end portion 32 and side wall 30 includes an outwardly offset lower end portion 34. An angled connector section 36 extends between side wall 28 and lower end portion 32, and likewise an angled connector section 38 extends between side wall 30 and lower end portion 34. Side wall 28 and lower end portion 32 lie in parallel planes, as do side wall 30 and its associated lower end portion 34.

Frame upper wall 26 defines a central groove 40 which extends to full length of frame 12 between first end 22 and second end 24. Groove 40 is defined by a downwardly deformed central section of upper wall 26 having an upper surface which is recessed relative to the upper surface of upper wall 26 on either side of groove 40. Belt 20 includes a dependent rib 42 (FIG. 5) which is received within groove 40.

Referring now to FIGS. 3, 4, and 5, tensioning section 18 is movably mounted to frame 12 at its first end 24 for selectively tensioning a belt 20 in a manner to be explained. Tensioning section 18 includes a pair of identical, spaced apart side plate structures 44, each of which is positioned inwardly adjacent one of the frame side walls 28, 30. Each identical side plate structure 44 includes a first member or head plate 46 which is selectively movable or locked relative to a second member or clamp plate 48.

Each head plate 46 extends longitudinally along an inner surface of a respective frame side wall 28, 30 and is integrally constructed of a forward or spindle mounting portion 50, a mid portion 52 and a rear portion 54 having an end wall 56. A vertical dividing wall 58 separates each mid portion 52 from its rear portion 54. Each head plate 46 has a planar top wall 60 and a planar bottom wall 62 which lie generally parallel to each other. Each forward or spindle mounting portion 50 is defined by a circular socket member 64 which is joined to its mid portion 52 by an angularly and inwardly offset segment 66.

An idler spindle 68 extends between and is rotatably mounted to and between the circular socket members 64. Idler spindle 68 includes belt engaging sections 70 with a groove 72 therebetween for receiving belt rib 42. The belt engaging sections 70 have a link for supporting substantially the entire width of the belt 20.

Figure 8:
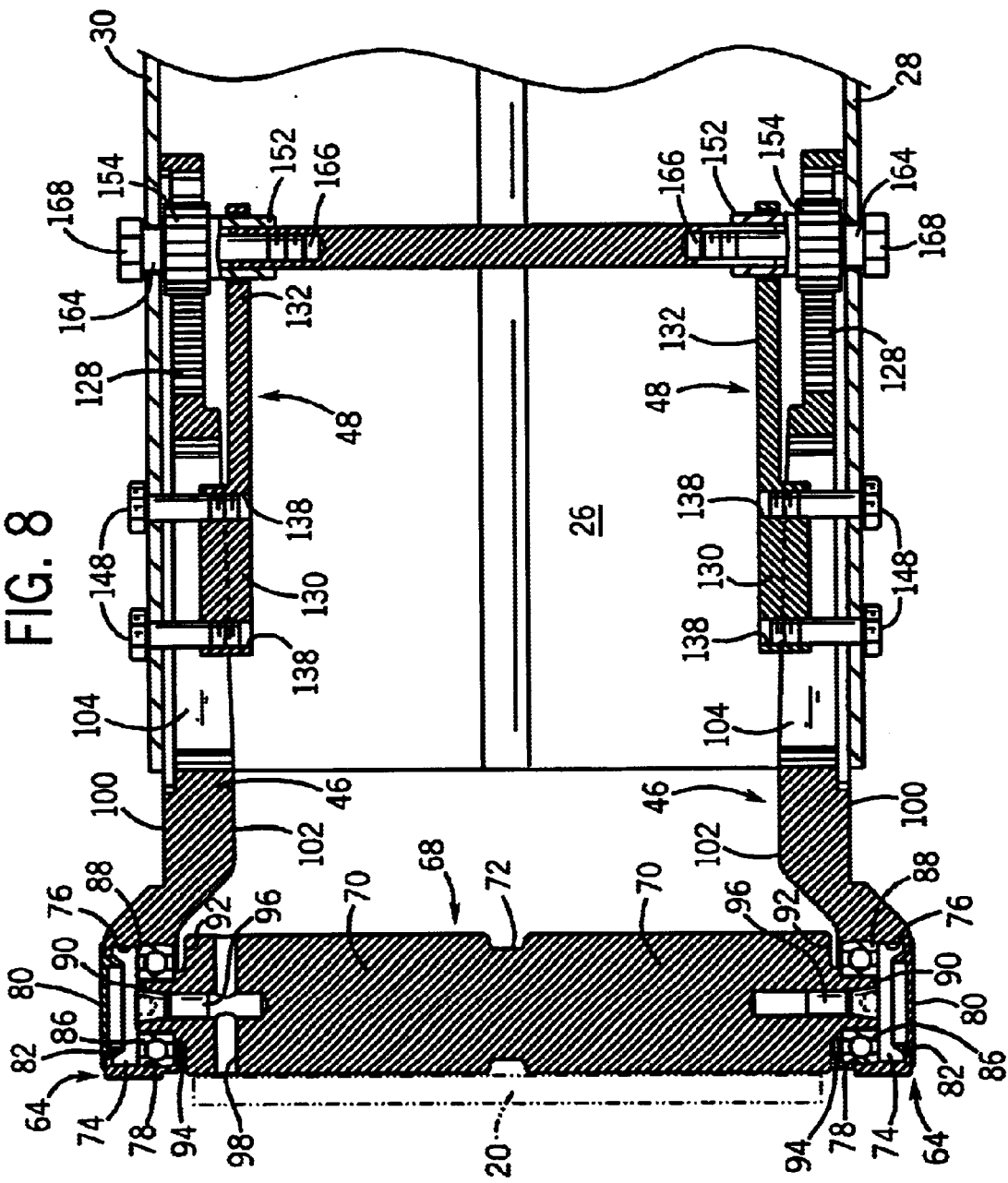
FIG. 8 is a sectional view of the movable tensioning section shown in FIG. 5.

As seen best in FIGS. 4 and 8, each circular socket member 64 forms a cavity 74 having circular outer walls 76 defining an outer opening, and circular inner walls 78 defining an inner opening. Each outer opening is closed by an end cap 80 having an inwardly extending ring 82 which is press fit against the outer walls 76. Each inner opening is shaped to receive and retain a spherical ball bearing assembly 84 having an inner race 86 and an outer race 88. The inner races 86 are slipped over short cylindrical heads 90 projecting from the end walls 92 of the spindle belt engaging sections 70 and lie against circular necks 94 surrounding the heads 90. Torque screws 96 are inserted through the inner races 86 and the heads 90 so that a tool may be introduced into passages (one being shown at 98) formed transversely in the spindle end portions for swaging the torque screws 96 outwardly into frictional contact with the heads 90 and the inner races 86. Because of the end caps 80 and the engagement of the inner races 86 with the radially extending necks 94 and the axially extending heads 90, this construction provides an effective arrangement for enclosing bearing assemblies 84 to ensure that water or other liquid cannot easily reach the interior of the bearing assemblies 84.

The mid portion 52 of each head plate 46 has respective outer and inner walls 100, 102 formed with a horizontal throughslot 104 which is alignable with a pair of openings 106 and frame side walls 28, 30. Each mid portion 52 provides an upper, outer edge 108 and a lower, outer edge 110 which are coplanar with the straight inner surface of a respective frame side wall 28, 30. Each mid portion 52 further provides an upper, inner edge 112 and a lower, inner edge 114 which are coplanar and integrally define a first pair of engagement surfaces constructed in accordance with the present invention. Referring to FIGS. 3, 4, 5 and 8, the upper and lower, inner edges 112, 114 have planar surfaces which angle slightly inwardly or taper toward their respective side walls 28, 30 as each mid portion 52 progresses longitudinally from front to rear.

The rear portion 54 of each head plate 46 has upper and lower, outer edges 116, 118 which are respectively aligned longitudinally with the upper and lower, outer edges 108, 110 of each mid portion 52. Each rear portion 54 also has upper and lower, inner edges 120, 122 which are outwardly recessed relative to the upper and lower, inner edges 112, 114 of each mid portion 52. In contrast with the outer and inner edges 108, 110, 112, 114 of each mid portion 52, the outer and inner edges 116, 118, 120, 122 of each rear portion 54 are generally parallel to each other. A horizontal throughslot 124 is provided in each rear portion 54 and lies in alignment with a single hole 126 in a respective frame side wall 28, 30. Each rear portion 54 carries a series of gear teeth 128 forming an axially extending gear rack located vertically above and inwardly of throughslot 124.

Figure 10:
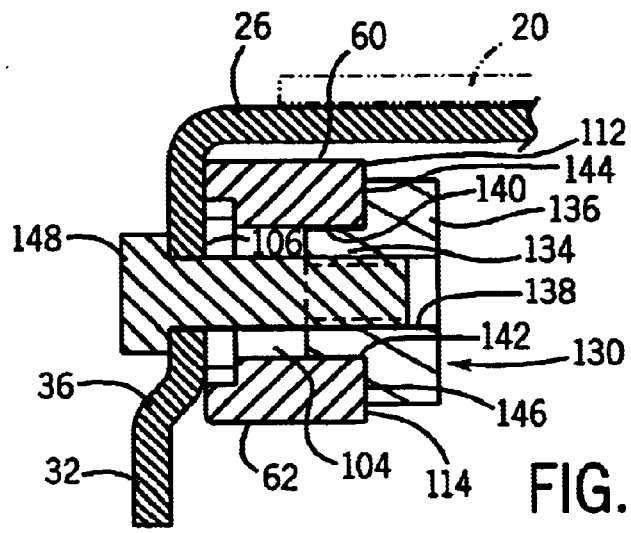
FIG. 10 is an enlarged sectional view taken on line 10—10 of FIG. 7.

Each clamp plate 48 is positioned inwardly of each head plate 46 and includes a restraining block 130 integrally connected to an extension portion 132. As seen in FIG. 10, each restraining block 130 is generally T-shaped in cross section and has an elongated outer section 134 and an inner section 136 which are provided with a pair of spaced apart, threaded apertures 138. Each outer section 134 is received within one of the throughslots 104 in a mid portion 52 and includes respective upper and lower, horizontal surfaces 140, 142 which respectively engage the outer, bottom portion of the mid portion top wall 60 and a outer, top portion of the mid portion bottom wall 62. Each inner section 136 has respective upper and lower, vertical faces 144, 146 which engage the upper and lower, inner edges 112, 114 of each mid portion 52 and define a second pair of engagement surfaces. Each pair of faces 144, 146 has planar surfaces which angle slightly outwardly or diverge complimentary to the upper and lower edges 112, 114 of each mid portion 52 as illustrated in FIGS. 3, 4, 5 and 8. Bolts 148 extend through aligned openings 106 and throughslots 104 and are threaded into apertures 138 to securely mount restraining blocks 130 to frame side walls 28, 30 when the tensioning section 18 is used to set a desired tension on the belt 20 as will be appreciated hereafter.

Referring to FIGS. 4, 5A, 7 and 9, the extension portion 132 of each clamp plate 48 terminates in a circular recess 150 which surrounds and rotatably receives a round adapter 152 that carries a rotatable drive pinion end 154 having a through hole 153. Each adapter 152 has a hexagonally shaped interior recess 155, the walls of which are press fit over mating hexagonally shaped outer walls 156 on each end of a rotatable hex rod or drive member 158. Each drive pinion end 154 extends into a respective throughslot 124 in each head plate rear portion 54, and has a series of radial teeth 160 which engage the axially extending teeth 128 of each rack depending from the underside of the top wall 60 forming the throughslot 124. The opposed ends of the drive member 158 are provided with threaded holes 162 which are in registration with the holes 126 formed in the frame side walls 28, 30. Sleeves 164 are inserted into the side wall holes 126, and inner ends 166 of bolts 168 extend through the sleeves 164 and the recesses 155 for threaded engagement in the holes 162 in drive member 158. It will be appreciated that rotation of a bolt 166 and drive pinion ends 154 and engagement of the rack teeth 128 will enable the head plates 46 and connected idler spindle 68 to extend and retract longitudinally relative to frame 12 so as to adjust tension on belt 20. It should be further understood that with the restraining blocks 130 inserted in throughslots 104 in the extension portions 132 engaged around the adapters 152 on the ends of drive member 158, the clamp plates 48 are always held fixed relative to the head plates 46.

In operation, tensioning section 18 is selectively moved relative to frame 12 and selectively locked into position as follows. Once belt 20 is initially installed such that rib 42 is received within frame groove 40 and in initial engagement with spindle groove 72, bolts 148 are loosened in the restraining blocks 130 to permit the head plates 46 and idler spindle 68 joined thereto to slide relative to the frame side walls 28, 30 and the clamp plates 48. One of the bolts 166 is then rotated to turn drive pinion ends 154 causing the racks formed by teeth 128 to move outwardly in unison and correspondingly move the head plates 46 and joined idler spindle 68 outwardly until the desired belt tension is achieved. During this outward or extendable movement, the engagement surfaces 112, 114 on each head plate mid portion 52 slide freely relative to engagement surfaces 144, 146 of clamp plate restraining blocks 130. Once the belt tension is set, the bolts 148 are tightened to lock head plates 46 and clamp plates 48 tightly together and at the same time, lock the idler spindle 68 in the desired position relative to the belt 20 as depicted in FIG. 5. Normally, the setting of the desired belt tension is maintained by the tightening of the bolts 148 in the restraining blocks 130 which place the engagement surfaces 112, 114 of the head plates 46 in a secured, flush relationship with engagement surfaces 144, 146 of the clamp plates 48.

It sometimes happens that an unexpected, involuntary force is applied to the idler spindle 68 by impact or collision with another static or moving component. In such cases, the intensity of the impact can overcome the force exerted by the applicable locking device. This causes the idler spindle 68 to be forcefully retracted in a manner which can decrease the belt tension and negatively effect the conveyor operation. In some situations, this undesirable, forceful retraction can also damage or destroy the teeth on the drive pinion. Such problems are minimized by the action of the cooperating engagement surfaces 112, 114, 144, 146 of the present invention.

FIG. 6 depicts such a situation wherein a random blow is inflicted upon the idler spindle 68 in the direction of arrow A. Such blow can overcome the locking force provided by the tightened bolts 148 and begins to retract the idler spindle 68 as the head plates 46 are forced rearwardly in the direction of the arrows B. However, the head plates 46 are only permitted to move from the phantom line position to the full line position a very small distance, typically a fraction of an inch, relative to the frame side members 28, 30 because the angled or tapered surfaces 112, 114 quickly slide into a wedging, restraining relationship with the corresponding fixed, clamp plate angled or diverging surfaces 144, 146. The wedging, progressively increasing frictional interaction between the angled, engagement surfaces 112, 114 and the angled, engagement surfaces 144, 146 tends to absorb the impact force on the idler spindle 68 so that the moving teeth 128 of the gear rack on the rear portions 54 will cause the drive pinion ends 154 to harmlessly rotate with respect thereto preserving the integrity of the drive pinion ends 154. Following this reaction, maintenance is undertaken to inspect the components of the tensioning section 18.

The present invention thus provides a restraining arrangement for limiting the retractable movement of and substantially maintaining the tension section 18 in a desired position even in the event of a random impact on the idler spindle 68. The engagement of drive pinion ends 154 with the rack teeth 128 on head plates 46 ensures that the head plates 46 are simultaneously and synchronously moved relative to frame 12. If belt 20 exhibits any skewing tendency, engagement of belt rib 42 with spindle groove 72 prevents skewing along with the action of the spherical ball bearing assemblies 84 on the ends of the idler spindle 68.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

We claim:

1. A conveyor construction comprising:
   a frame having a pair of fixed side members depending from an upper wall;
   a conveyor belt extending along the frame and having an upper run supported by the upper wall;
   a tensioning section movable inwardly and outwardly relative to the frame for establishing a desired tension in the belt, the tensioning section including a spindle supported between a pair of side plates each located adjacent to one of the side members of the frame, each of the side plates including a movable head plate having a planar, elongated first engagement surface tapering longitudinally towards one of respective side members between the spindle and the drive member;
   a drive member rotatably mounted between the side members and drivingly engaged with the side plates for imparting longitudinal extendable and retractable movement of the side plates relative to the frame;
   a pair of stationary clamp plates, each having a planar, elongated second engagement surface, diverging longitudinally towards one of the respective side members between the spindle and the drive member; and
   a locking device for exerting a frictional locking force between the angled first engagement surfaces of the head plates and the second engagement surfaces of the clamp plates, and holding the spindle in a predetermined position,
   each first engagement surface being freely slidably movable along one of the second engagement surfaces as the tensioning section moves outwardly relative to the frame, and each first engagement surface being slidably movable into a wedging, progressively increasing frictional relationship with one of the second engagement surfaces as the tensioning section moves inwardly relative to the frame to limit the extent of inward movement of the tensioning section upon imposition of a longitudinal force applied to the spindle in the direction of the drive member and overcoming the locking force of the locking device.

2. The conveyor of claim 1, wherein the drive member includes opposed ends each including a drive pinion end, each drive pinion end being adapted for engagement with a set of teeth formed on each of the side members.

3. The conveyor of claim 1, wherein each of the stationary clamp plates is coupled to the drive member such that the clamp plates are each stationary relative to the drive member.

4. The conveyor of claim 3, wherein each of the clamp plates includes a circular recess sized to receive a portion of one of the drive pinion ends, wherein the drive pinion ends are rotatable within the circular recesses.

5. The conveyor of claim 1, wherein each of the side plates includes a first throughslot and the first engagement surfaces include a first pair of upper and lower angled surfaces; and
   wherein each of the second engagement surfaces formed on the stationary clamp plates include a second pair of upper and lower angled surfaces that are selectively slidable and lockingly engageable with one of the first pair of upper and lower angled surfaces on the side plates.

6. The conveyor of claim 5, wherein the first and second pairs of angled surfaces are constructed and arranged to move into a wedging relationship with one another upon the imposition of a longitudinal force applied to the spindle.

7. The conveyor of claim 6, wherein the locking device includes a plurality of locking bolts each extendable through the first throughslot formed in the side plates and received within corresponding bores formed in the stationary clamp plates.

8. In a conveyor construction including a frame having a pair of side members, a belt, a tensioning section mounted for longitudinal extendable and rectractable movement relative to the frame for establishing a desired tension on the belt and including a spindle engaged with the belt and a pair of side plate structures connected to the spindle and located one adjacent each frame side member, a drive member rotatably mounted relative to the frame and drivingly engaged with the tensioning section for imparting longitudinal extendable and rectractable movement relative to the frame upon rotation of the drive member, and a locking device exerting a frictional locking force on the side plate structures relative to the frame side members for selectively fixing the position of the tensioning section relative to the frame, the improvement comprising:

a restraining arrangement incorporated in the side plate structures for limiting the retractable movement of the tensioning section upon the imposition of a random force applied to the spindle and overcoming the frictional locking force of the locking device so as to substantially retain the desired tension on the belt and preserve operability of the drive member, the restraining arrangement being independent of the locking device and defined by each of the side plate structures having a pair of plates slidable relative to one another, one of the plates having a longitudinally tapered portion and the other of the plates having a longitudinally diverging portion, the tapering and diverging portions being slidably movable into progressively increasing frictional engagement with one another.

9. The improvement of claim 8, wherein each of the side plate structures includes a first member which is selectively movable or locked relative to a fixed second member.

10. The improvement of claim 9, wherein the first member includes a head plate extending longitudinally along an inside surface of one of the frame side members.

11. The improvement of claim 10, wherein the second member includes a clamp plate extending longitudinally along an inside surface of the head plate.

12. The improvement of claim 10, wherein the head plate is integrally constructed of a forward position, a mid portion and a rear portion.

13. The improvement of claim 10, wherein the spindle has opposed ends, each end being rotatably mounted to the head plate.

14. The improvement of claim 12, wherein the forward portion of the head plate includes a circular socket member connected to the mid portion by an angularly and inwardly offset segment, the socket member receiving a spherical ball bearing assembly for enabling rotation of the spindle.

15. The improvement of claim 12, wherein the mid portion is formed with a first throughslot and includes a first pair of upper and lower angled surfaces.

16. The improvement of claim 15, wherein the rear portion is formed with a second throughslot and includes a set of teeth extending axially along a wall forming the second throughslot.

17. The improvement of claim 16, wherein the drive member has opposed ends provided with drive pinion ends rotatably mounted to the frame side members, each drive pinion end extending into the second throughslot for engagement with the axially extending teeth on the rear portion of the head plate.

18. The improvement of claim 16, wherein the clamp plate includes a restraining block integrally connected to an extension portion which rotatably receives an adapter connected to each drive pinion end.

19. The improvement of claim 18, wherein the restraining block is inserted into the first throughslot formed in the mid portion of the head plate and locked to one of the frame side members.

20. The improvement of claim 19, wherein the restraining block includes a second pair of upper and lower angled surfaces which are selectively slidably and lockingly engageable with the first pair of upper and lower angled surfaces on the mid portion of the head plate.

21. The improvement of claim 20, wherein the first and second pairs of angled surfaces are constructed and arranged to move into a wedging relationship with one another upon imposition of the random force applied to the spindle.

22. In a conveyor construction including a frame having a pair of side members, a belt, a tensioning section mounted for longitudinal extendable and retractable movement relative to the frame for establishing a desired tension on the belt and including a spindle engaged with the belt and a pair of side plate structures connected to the spindle and located one adjacent each frame side member, a drive member rotatably mounted relative to the frame and drivingly engaged with the tensioning section for imparting longitudinal extendable and retractable movement relative to the frame upon rotation of the drive member, and a locking device exerting a frictional locking force on the side plate structures relative to the frame side members for selectively fixing the position of the tensioning section relative to the frame, the improvement wherein:

each of the side plate members includes a longitudinally tapering first member selectively movable and lockable with respect to a longitudinally diverging second member, the first member being freely slidable upon the second member when the tensioning section is extended, and the first member being slidable into a wedging, progressively increasing frictional relationship with the second member when the tensioning section is retracted.

23. The improvement of claim 22, wherein the first member is a head plate formed with a top wall, a bottom wall and a first throughslot and including upper and lower, inner edges having planar surfaces which angle slightly inwardly towards a respective one of the frame side members as the head plate extends from front to rear.

24. The improvement of claim 23, wherein the second member is a clamp plate including a restraining block having an outer section received in the first throughslot and an inner section which is coplanar with an extension portion.

25. The improvement of claim 24, wherein the outer section of the restraining block includes an upper horizontal surface engageable with an outer, bottom portion of the head plate top wall, and a lower horizontal surface engageable with an outer, top portion of the head plate bottom wall.

26. The improvement of claim 25, wherein the inner section of the restraining block includes an upper vertical face engageable with the upper inner edge of the head plate, and a lower, vertical face engageable with the lower inner edge of the head plate, the upper and lower, vertical faces having planar surfaces which extend at an angle from front to rear complementary to the angle formed on the upper and lower inner edges on the head plate.

27. The improvement of claim 26, wherein the locking device includes a pair of fasteners passing through respective holes formed in a respective frame side member and the first throughslot for threaded engagement with the restraining block whereby tightening of the fasteners will lock the head plate and clamp plate together relative to the respective frame side member.

* * * * *